United States Patent [19]

Darling

[11] 4,013,110
[45] Mar. 22, 1977

[54] LOCKING THREAD

[75] Inventor: Myron E. Darling, Webster City, Iowa

[73] Assignee: BJD Industries, Inc., Minneapolis, Minn.

[22] Filed: June 12, 1975

[21] Appl. No.: 586,184

[52] U.S. Cl. .................. 151/14 R; 151/21 R; 151/22
[51] Int. Cl.² ........................ F16B 39/22
[58] Field of Search ............... 151/14 R, 20, 21 B, 151/22, 21 R

[56] References Cited

UNITED STATES PATENTS

| 290,028 | 12/1883 | Fulwiler | 151/19 |
|---|---|---|---|
| 900,796 | 10/1908 | Tambling | 151/20 |
| 1,476,455 | 12/1923 | Marye | 151/21 B |
| 1,812,785 | 6/1931 | Helin | 151/14 R |
| 1,963,845 | 6/1934 | Hosking | 151/22 X |
| 2,361,107 | 10/1944 | Johnson | 151/22 |
| 2,748,647 | 6/1956 | Notturno | 85/33 |
| 2,789,458 | 4/1957 | Skeisuoll | 85/33 |
| 3,060,787 | 10/1962 | Kraus et al. | 85/33 |
| 3,312,264 | 4/1967 | Dresdner | 151/19 |
| 3,356,121 | 12/1967 | Tabor | 151/21 B |
| 3,438,417 | 4/1969 | Albris | 151/20 |
| 3,439,722 | 4/1969 | Brandon | 151/14 |
| 3,460,598 | 8/1969 | Thurston | 151/22 |
| 3,687,181 | 8/1972 | Coyle | 151/14 R |

FOREIGN PATENTS OR APPLICATIONS

| 766,562 | 4/1934 | France | 151/20 |
|---|---|---|---|
| 734,903 | 8/1932 | France | 151/20 |
| 395,331 | 10/1931 | United Kingdom | 151/20 |
| 17,482 | 11/1909 | United Kingdom | 151/14 R |
| 489,885 | 8/1938 | United Kingdom | 151/21 B |

Primary Examiner—Ramon S. Britts
Assistant Examiner—Thomas J. Holko
Attorney, Agent, or Firm—Henderson, Strom and Sturm

[57] ABSTRACT

Threads for a fastener of a type having an opening in one member with internal helically-shaped threads around the inner periphery thereof, and another member having helical threads around the outer periphery of a cylindrical portion thereof, wherein the cylindrical portion is adapted to be placed in the opening by relative rotation of the two threaded members. The internal threads of the opening and the external threads of the cylindrical portion being substantially identical except that the helix or lead angle of one of the thread formations is 39 to 85 percent of the helix angle of the other thread formation to thereby cause a higher prevailing torque for the purpose of impeding relative movement of the threaded members when the threads are engaged. This invention is particularly useful for the construction of what is commonly referred to as lock nuts.

9 Claims, 2 Drawing Figures

LOCKING THREAD

BACKGROUND OF THE INVENTION

The present invention relates generally to a mating thread formation, and more particularly to a mating thread formation which is suitable for substantially locking threaded members together and making it necessary to develop a high degree of prevailing torque to unfasten the mating threads.

Conventional mating nuts and bolts have threads which are of a helical configuration and wherein the internal threads of the nut are substantially the same in configuration as the external threads of the bolt, with the possible exception that sometimes the internal threads of the nut are very slightly larger in diameter than the external threads of the bolt. There may further be certain variances depending upon the tolerances required in constructing such nut and bolt devices. These external threads would, however, have substantially the same number of threads per inch, identical angles formed between the flanks of the thread and they would have the same helix or lead angle. These comprise the most common type of nut and bolt devices.

When using a conventional nut and bolt device on something which has movement associated therewith, it is usually necessary to tighten the nut with respect to the bolt to such a degree that the bolt will stretch slightly and by such action will keep the threads in tight engagement to a degree. It has been found, however, that once such nut becomes loose, that constant or intermittent vibrations will tend to rotate the nut with respect to the bolt to a point in which the nut will be completely separated from the bolt. For this reason many devices have been developed to prevent such a nut from being separated from the bolt. Such devices can vary from the use of a pin extending through the bolt to what is commonly referred to as a lock nut device.

Lock nut devices operate on many different principles. One type of lock nut device uses thread distortion to create the requirement of a high prevailing torque in order to turn the nut with respect to the bolt. This thread distortion is usually accomplished by taking a standard nut and punching inwardly thereon at least at one point about the periphery thereof, to such a degree that the inner threads are permanently distorted. Consequently, when this nut is screwed onto a bolt, a higher degree of prevailing torque will be necessary for relative rotation than if the threads of the nut exactly conformed to the threads of the bolt. One of the problems with such a lock nut device is that this secondary operation of punching is an added expense, and a further disadvantage of this type of lock nut is that after several uses, the thread on the bolt will be forced to conform to the distorted thread form on the nut such that it will not provide the desired high prevailing torque after such multiple uses.

Another way to cause locking and thereby a high prevailing torque necessary to turn the nut with respect to the bolt is to spray a locking material on the threads of the nut or the bolt or both. This, too, is somewhat expensive and inconvenient; and, furthermore, must be done each time the nut is removed from the bolt or the high degree of prevailing torque which is desired is not achieved.

Another common lock nut which has received commercial success, is a nut having a standard thread thereon, but which has a nylon insert in one end thereof. Such nylon insert is not initially threaded. Such nylon-type lock nut is constructed by having a chamber on one end of the nut which is initially open. An annular nylon member is then inserted into this opening and that end of the lock nut is then clamped over the nylon insert. It can be easily appreciated that these extra steps and extra elements are quite an added expense to the construction of such locking device. A further disadvantage of such a device is that such lock nut can only be screwed onto a bolt from one preselected side of the nut to achieve the desired locking. Furthermore, multiple uses of such a locking device significantly diminish the effectiveness thereof, because the nylon washer is deformed during each use. After many uses the nylon-type lock nut will not cause the desired high prevailing torque necessary for turning the mating threads.

It can therefore be appreciated that there is indeed a need for a simple and inexpensive lock nut which can be used many times without losing its effectiveness.

SUMMARY OF THE INVENTION

The present invention relates to a member having a helical thread formation about the outer periphery thereof, such thread formation having a crest and a root portion; and, such thread formation further being formed about a longitudinal axis. A second complementary member has an opening therein with a helical thread formation formed about the inner periphery thereof and formed about the same longitudinal axis. The thread formations of one of the members having a defined magnitude and the other helix angle being different from the first helix angle by a magnitude of between plus or minus 39 and 85 percent of the first helix angle.

An object of the present invention is to provide a locking thread which is highly effective and yet is simple and economical to manufacture.

Another object of the invention is to provide a locking thread which has an on-off prevailing torque ratio as close to 1:1 as is possible.

A further object of the invention is to provide a locking thread arrangement which is effective after many uses thereof.

Still another object of the invention is to provide a lock nut which can be installed from either side thereof to a threaded bolt.

Other objects, advantages, and novel features of the present invention will become apparent from the following detailed description of the invention when considered in conjunction with the accompanying drawings.

DESCRIPTION OF THE PREFERRED EMBODIMENT

Figure 1:
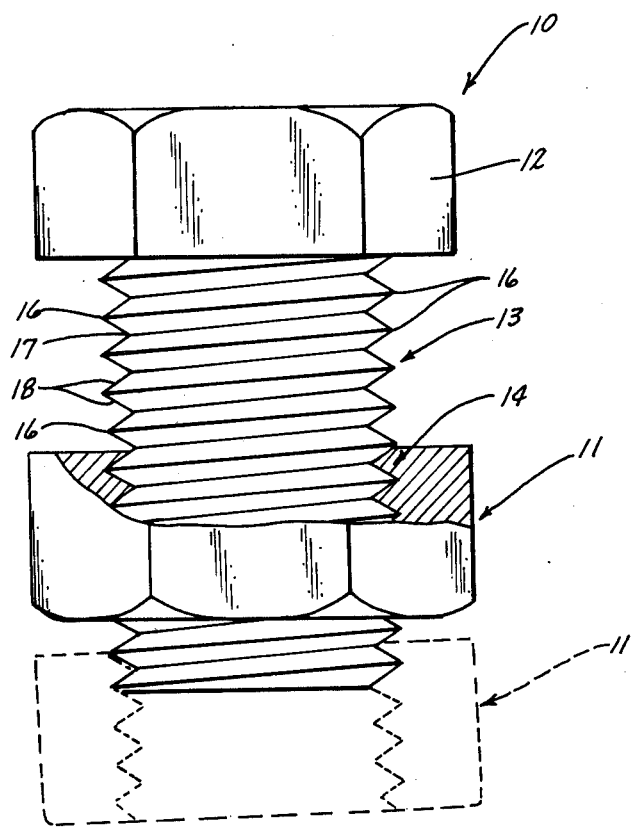
FIG. 1 is a plan view of the locking thread of the present invention shown on a nut and a bolt, and wherein the nut is shown screwed onto the bolt in solid lines and is shown being started on the bolt in dashed lines.

Referring now to the drawings wherein like reference numerals designate identical or corresponding parts throughout the several views, FIG. 1 shows a bolt 10 and a nut 11 constructed in accordance with the present invention. The bolt 10 has a hexagonally-shaped head 12 on one end thereof and a threaded portion 13 comprising a plurality of convolutions extending the remainder of the length of the bolt 10. The nut 11 has internal threads 14 comprising a plurality of convolutions extending along the inner periphery thereof. The thread of the bolt 10 is helical in shape and is comprised of a thread which is substantially triangular in cross-sectional shape. The crest of the thread of bolt 10 is numbered 16 and the root of such thread is labeled 17. The surfaces connecting the crest 16 to the root 17 of the bolt 10 are commonly referred to as flanks, these flanks being numbered 18 in the drawings.

Figure 2:
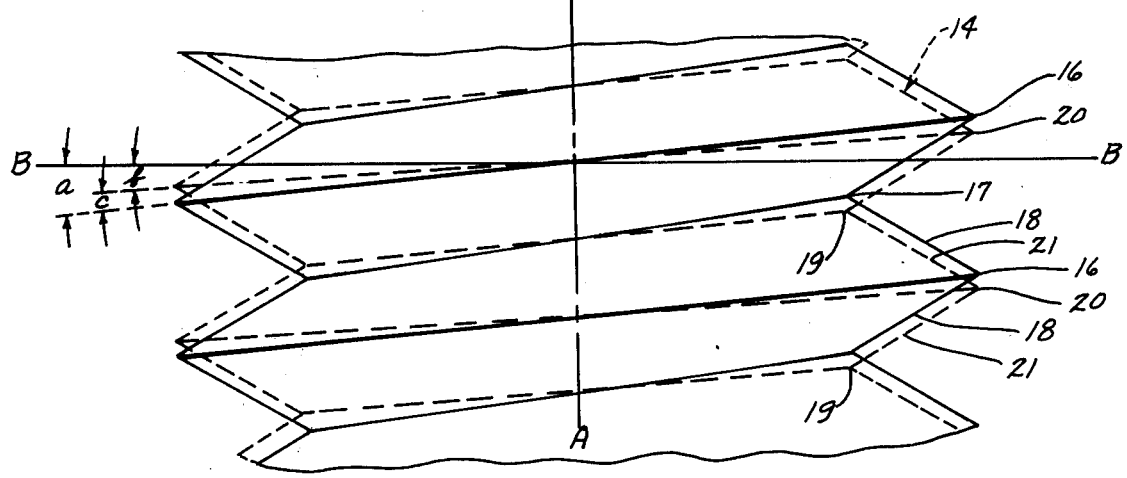
FIG. 2 is a simplified partial view of the present invention showing the thread formation of the bolt in solid lines and the thread formation of the nut superimposed thereover in dashed lines for the purpose of comparison.

Referring to FIG. 2, it can be seen that the internal threads 14 of the nut (shown in dashed lines) also have crests 19 and roots 20. Flanks 21 connect the crest 19 with the root 20 of the internal threads 14 of the nut 11. FIG. 2, also, shows the longitudinal axis A—A of the threads of the bolt 10 and the nut 11. The line B—B represents a plane which is perpendicular to the longitudinal axis line A—A. The angle $a$ represents the helix or lead angle of the thread of the bolt 10 which helix angle is substantially constant throughout the convolutions of the thread. This helix angle $a$ is measured by the angle between a straight line projecting substantially along a portion of the crest 16 of the bolt 10 and the plane B—B. The angle $b$ is defined as the angle between the plane B—B and a line extending along the root 20 of the nut 11. The angle $b$ represents the helix angle of the thread of the nut 11 which helix angle is substantially constant throughout the convolutions of the thread. The same angle $b$ would be formed if the angle was measured by using a line projecting along the crest 19 of the thread 14 of the nut 11, since the crest 19 is substantially parallel to the root 20. These parameters are defined in detail on pages 1,103–1336 in the Machinerys Handbook, 16th Edition (1962), published by the Industrial Press located at 93 Worth Street, New York City, New York. The helix angles are measured and defined in page 1244 of that publication. The reference material in such publication being incorporated herein by reference. Also, being incorporated herein by reference is the Industrial Fastener Handbook, 5th Edition, published in 1970 by the American Society of Mechanical Engineers at 1505 E. Ohio Building in Cleveland, Ohio. Of particular significance in the Industrial Fastener Handbook is Section M which defines the relevant terms and the uniform screw thread series.

In standard nut and bolt devices intended for use with one another, the angle $a$ would be equal to the angle $b$ instead of being different, except for slight irregularities depending on the tolerances used. The angle $c$ is defined as the difference between the angle $a$ and the angle $b$, i.e., angle $c$ equals angle $a$ minus angle $b$. For the purposes of the present invention and referring specifically to the preferred embodiment, the change in the helix angle represented by angle $c$ would be of a magnitude of between 39 and 85 percent of the first helix angle $a$ in order to achieve the proper relationship.

To illustrate the importance of the above referred to relationship, assume for the moment that the bolt 10 is a bolt having a standard thread thereon. This standard thread of the bolt 10 would then, of course, have a helix angle defined by the angle $a$ as shown in FIG. 2. In order to construct a lock nut 11 which would function properly according to the present invention, the lead angle of such lock nut 11 would have a helix angle $b$ as shown in FIG. 2. All of the other relationships of the thread 14 of the nut 11 would be standard, such as the number of threads per inch, the angle formed between the adjacent flanks 18, the nominal diameters, etc. It is the relationship of the helix angle $b$ of the nut, with respect to the helix angle $a$ of the bolt that is critical. In order to determine the acceptable magnitude of the helix angle $b$ of the nut 11, any desired percentage between 39 and 85 percent of the angle $a$ is chosen, depending upon how high of a prevailing torque is desired, and this percentage of angle $a$ would produce the desired difference $c$. The greater the percentage used the higher the prevailing torque crested thereby would be. The desired difference $c$ would then be subtracted from the angle $a$ and the result would be the desired helix angle $b$ to be used on the nut 11. It has been found that this relationship will operate effectively at least when materials having a Rockwell hardness of B-60 or harder are used.

In operation, the nut 11 would be started onto the bolt 10 as shown in dashed lines in FIG. 1. It will be noted that the nut 11 is tilted somewhat with respect to the bolt 10 when only the first thread is engaged. While this has been exaggerated somewhat in FIG. 1, it can be appreciated that the difference in the helix angles between the bolt 10 and the nut 11 cause the nut to be in this position when only on one thread. After approximately two and one-half threads of the nut 11 have engaged with the same number of threads on the bolt 10, then the nut 11 will straighten out as it shown in solid lines in FIG. 1. Once the nut straightens out with respect to the bolt, the locking begins. Since the helix angles of the thread formations on the bolt 10 and the nut 11 are different as defined by the critical relationship referred to above, the flanks 18 of the bolt 10 will push against the flanks 21 of the nut 11 and vice versa. In this way the projecting portions of the threads of both the nut 11 and the bolt 10 will bend slightly and be forced to conform to one another, as shown in FIG. 1. This bending over of the projecting portions of each of the thread formations on the bolt and nut 10 and 11 respectively, cause a very tight fit between the nut and the bolt. This tightness is caused by friction formed between the mating surfaces of the flanks 18 of the bolt and the flanks 21 of the nut. If the nut and bolt are constructed of materials having a Rockwell hardness of B-60 or greater, the threads will not be permanently deformed when the nut 11 is screwed onto the bolt 10, but instead a lasting and unrelenting pressure will be forcing the mating flanks together. It is this action which forms the superior locking and holding capability of the present invention.

The prevailing torque required to rotate the nut 11 with respect to the bolt 10 is nearly the same when the nut 11 is turned off as when it was screwed onto the bolt 10. For example, in the models constructed, the on prevailing torque was 30 pounds and the off prevailing torque required was 28 pounds when a 10—10 carbon steel was used and when the bolt was a 5/16-18 American standard thread in class 2A and the nut was changed as noted in the above formula at 60 percent. This nearly one to one on-off ratio is primarily due to the fact that the threads of the nut and bolt have not been permanently deformed, but have only been elastically deformed. Such is to say that the projecting portions of the threads of the nut 10 and the bolt 11 have not been deformed beyond their yield point so as to not be permanently deformed, but have only been deformed within the elastic range of the material such that they will return to the normal shape when the nut 11 has been removed from the bolt 10. It can clearly be seen that if the angle $b$ is too small with respect to the angle $a$ (i.e., angle $c$ equalling more than 85 percent of angle $a$) that it would be too difficult to turn the nut 11 onto the bolt 10 and some permanent deformation would occur in the thread formations of the nut and/or the bolt; and, that if the angle $b$ was not changed enough (i.e., angle $c$ equalling less than 39 percent of the angle $a$) as defined by the critical relationship referred to above, then the desired locking between the threads of the nut and bolt would not occur.

Accordingly, it can be seen that the present invention does indeed accomplish the objects mentioned above. It is furthermore important to note that it is not critical as to which thread is changed with respect to the other. For example, the bolt helix angle could be changed and the thread and helix angle of the nut could remain standard. It is also true that neither of the thread formations of the nut 11 or the bolt 10 would need to be standard so long as the critical relationships referred to above are maintained. It is, however, more commercially acceptable to have one of the thread forms standard so as to require a change in only the mating thread form. It is also important to note that this particular invention is applicable to any thread formation and is not, of course, limited to threads that are formed on a nut and bolt. Obviously, many modifications and variations of the present invention are possible in light of the above teachings. It is therefore to be understood that, within the scope of the appended claims, the invention may be practiced otherwise than as specifically described.

I claim:
1. A locking thread comprising:
   a first member having a helical thread formation comprising a plurality of convolutions about the outer periphery thereof, said thread formation having a crest and a root portion, said helical thread formation being formed about a longitudinal axis;
   a second member having an opening therein, said opening having a helical thread formation comprising a plurality of convolutions about the inner periphery thereof formed about said longitudinal axis, said thread formation of said second member having a crest and a root portion;
   one of said thread formations having a first helix angle which, in an unstressed condition, is substantially constant throughout at least one thread convolution;
   the other of said thread formations having a helix angle which, in an unstressed condition, is substantially constant throughout at least one thread convolution and which differs from the first helix angle by a magnitude of between 39 and 85 percent of said first helix angle; and
   said helix angles being defined by the angle between a straight line projecting substantially along a portion of the crest of the respective thread formation and a plane which is perpendicular to said longitudinal axis; and, whereby said first member is adapted to be received in said opening of the second member thereby causing said thread formations to be in engagement.
2. A locking thread as defined in claim 1 wherein said first and second members are constructed of materials having a Rockwell hardness of B-60 or harder.
3. A locking thread as defined in claim 1 wherein said thread formations are substantially complementary in shape except for the said difference in the helix angle.
4. A locking thread as defined in claim 1 wherein said first and second members are made of materials having similar properties of elasticity and deformation.
5. A locking thread as defined in claim 1 wherein said first member is a bolt and said second member is a nut.
6. A locking thread as defined in claim 5 wherein said materials are steel.
7. A locking thread as defined in claim 1 wherein said first and second members are constructed of an identical material.
8. A locking thread as defined in claim 1 wherein said magnitude is a predetermined constant amount between 39 and 85 percent of the first helix angle.
9. A locking thread as defined in claim 1 wherein said one and said other thread formations have an identical pitch which is constant along the entire length of said thread formations.

* * * * *